C. A. TURNER.
BALANCED VALVE.
APPLICATION FILED OCT. 9, 1907.
951,551.
Patented Mar. 8, 1910.
2 SHEETS—SHEET 1.
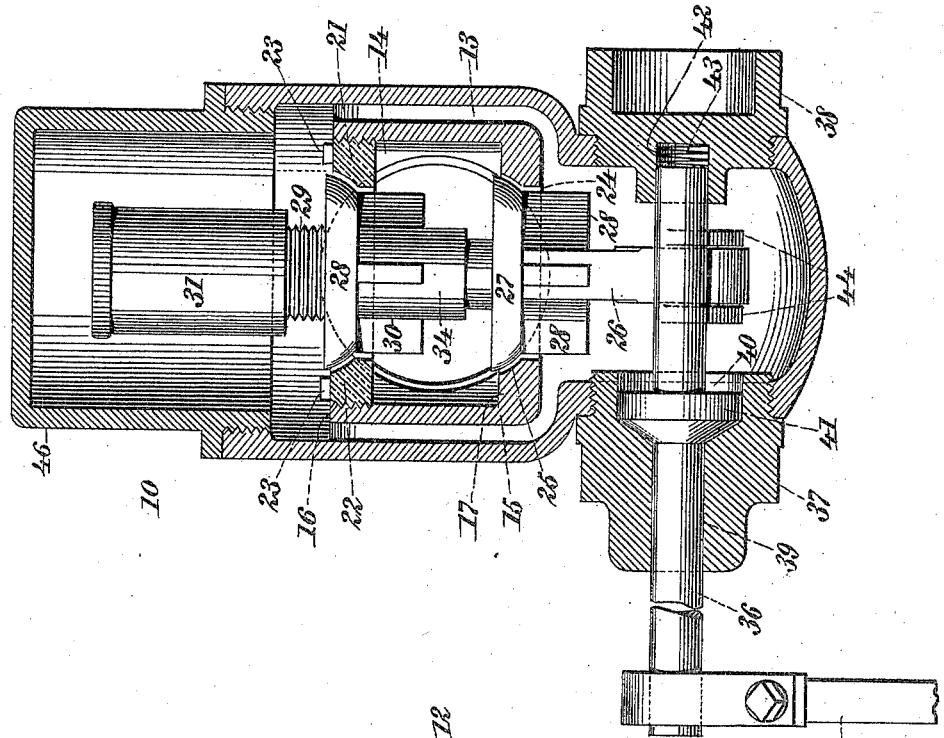
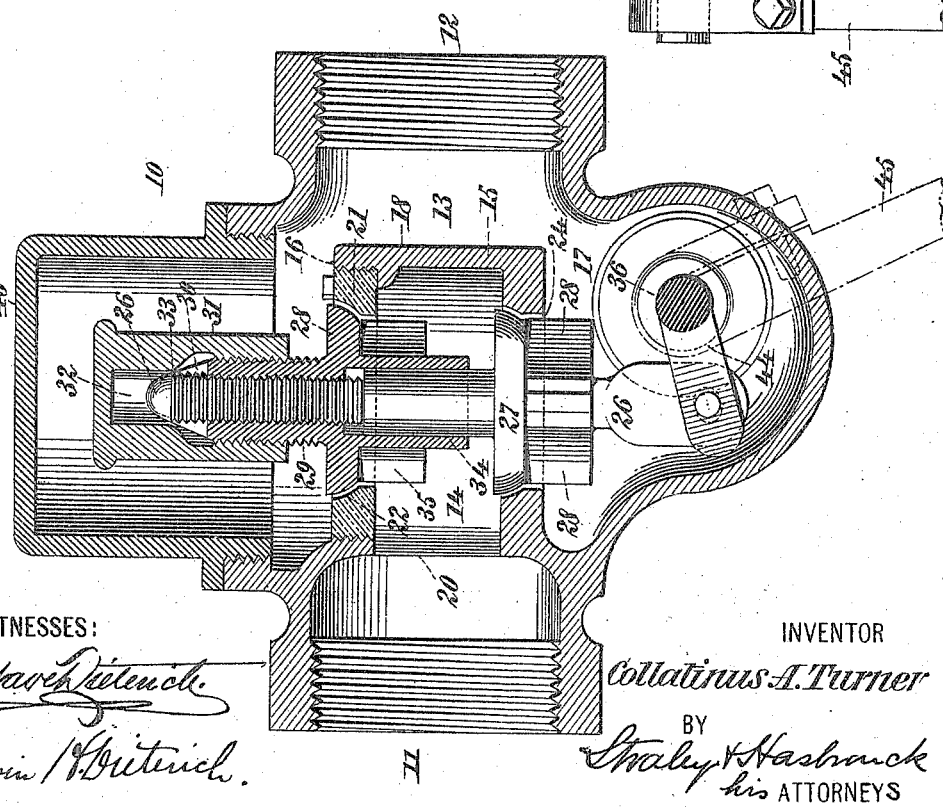

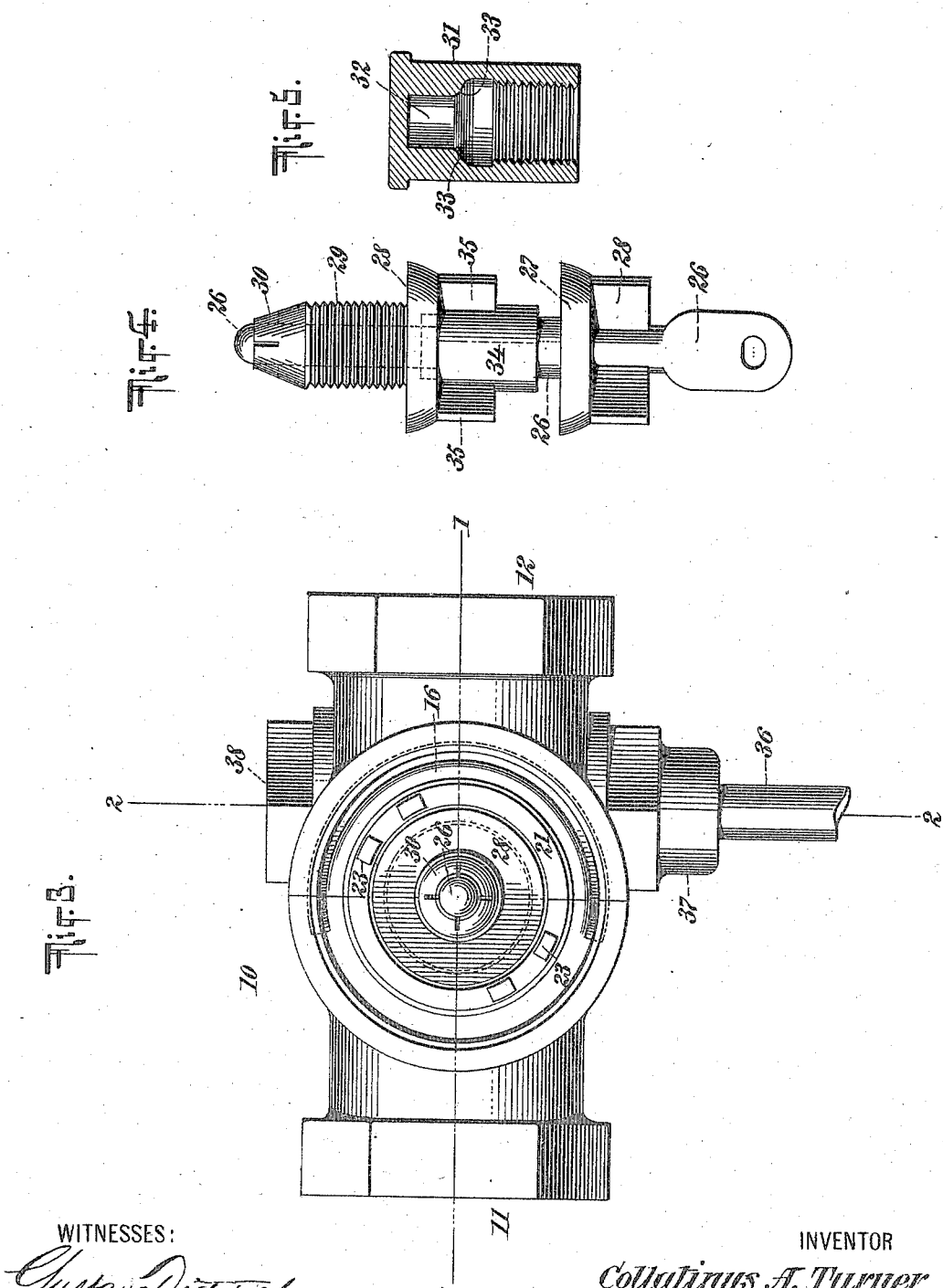

UNITED STATES PATENT OFFICE.

COLLATINUS A. TURNER, OF NEW YORK, N. Y.

BALANCED VALVE.

951,551.  Specification of Letters Patent.  Patented Mar. 8, 1910.

Application filed October 9, 1907. Serial No. 396,601.

*To all whom it may concern:*

Be it known that I, COLLATINUS A. TURNER, a citizen of the United States, residing at the city of New York, borough of Manhattan, in the county and State of New York, have invented certain new and useful Improvements in Balanced Valves, of which the following is a full, clear, and exact specification.

My invention relates to improvements in means for controlling the passage of fluids, and the same has for its object more particularly to provide a simple, efficient and reliable balanced valve in which two valves of equal areas are employed; one seating against, and the other seating in the direction of the flow of the fluid controlled by the device.

Further, said invention has for its object to provide a valve having a removable seat bushing in order to permit of its removal from the valve to permit of the passing of one of the valves, which is fixed upon the valve stem, through the aperture adapted to receive and support said removable seat bushing.

Further, said invention has for its object to provide a valve in which one valve is rigidly secured upon the valve stem, and the other made adjustable thereon in order to render possible the accurate adjustment of said valves relatively to their seat and insure the proper closing thereof.

Further, said invention has for its object to provide means for firmly securing and locking the adjustable valve upon the valve stem and at the same time prevent any leakage between said stem and the adjustable valve thereon.

Further, said invention has for its object to provide a valve in which all the operating parts are so constructed and arranged that the same will provide a fluid-tight closure without the use of stuffing boxes or packings of any kind.

To the attainment of the aforesaid objects and ends my invention consists in the novel details of construction, and in the combination, connection and arrangement of parts hereinafter more fully described and then pointed out in the claims.

In the accompanying drawings forming part of this specification wherein like numerals of reference indicate like parts, Figure 1 is a central, longitudinal section taken on the line 1—1 of Fig. 3, showing one form of valve made according to, and embodying my said invention; Fig. 2 is a central, transverse section taken on the line 2—2 of Fig. 3; Fig. 3 is a plan or top view of the valve with the cap removed to show the interior construction thereof; Fig. 4 is a detail side view of the valve stem and valves arranged thereon, the same being shown removed from the casing, and Fig. 5 is a detail central section showing the construction of the locknut and cap for securing the adjustable valve upon the valve stem.

In said drawings the casing is designated in a general way by the reference numeral 10, and is shown as having an inlet 11, and outlet 12. The interior of the casing is divided into two chambers or compartments 13, 14. The inner chamber or compartment 14 is formed by a receptacle 15 having a flat horizontally-arranged top 16 and bottom 17 united by a substantially semi-circular wall 18. The transverse area of the receptacle 15 being less than the interior area of the casing 10 so as to provide a space intermediate said receptacle 15 and casing 10, as shown at Figs. 2 and 3. The inlet portion 11 of the casing is connected directly to the receptacle 15 and communicates with the interior thereof by an aperture 20 arranged in said receptacle 15, and the outlet 12 communicates directly with the interior of the casing 10 surrounding the receptacle 15. The top 16 of the receptacle 15 is provided with a threaded opening to receive a seat bushing 21 provided with a centrally-located valve seat 22, and upwardly-extending lugs 23, 23 adapted to be engaged by a wrench or spanner in order to remove said seat bushing 21. The bottom 17 of the receptacle 15 is also provided with an opening 24 arranged in line with the valve seat in the bushing 21 above the same, and provided with a valve seat 25 coextensive in diameter with the seat in the bushing 21.

26 denotes a valve stem having a valve 27 made integral with the stem 26 and arranged thereon adjacent to its lower end, and provided with integral guide vanes 28, 28. The upper portion of said stem 26 is provided with a reduced threaded portion 26$^a$ upon which is arranged an adjustable valve 28 having an upwardly-projecting threaded tubular stem portion 29 which is provided at its upper portion with a split, tapered end 30. Upon the outer surface of the tubular stem portion 29, which surface is also threaded, is arranged a cap 31 provided with screw threads arranged to engage those upon the outer surface of the stem portion 29, and a centrally located circular recess 32, the edge of which, at the junction of said threaded portion and recess 32, forms a seat 33 into which the split, tapered end of the stem portion 29 is ground. From the underside of the valve 28 depends a tubular guide 34 which extends over and works upon the portion of the valve stem 26 above the integral valve 27 and is provided with integral vanes 35, 35. The valves 27 and 28 are both slightly rounded and conform to their respective seats.

36 denotes a rock-shaft which is arranged in the lower part of the casing 10 and supported in the removable bearing members 37, 38 which are made in the form of screw plugs. The member 37 is provided with a centrally-located opening 39 extending therethrough and terminating at its inner end in an enlarged portion 40 having an inclined base or seat to receive the tapered side of a head or collar 41 on the rock shaft 36 and located within the enlarged portion 40 in the bearing member 37. The bearing member 38 is provided upon its inner side with a centrally-located recess 42 to receive the inner end of the rock shaft 36, and a coil spring 43 bearing against said end to hold the head 41 duly seated within the enlarged portion 40 of the bearing 37.

44 denotes an arm fixed upon or integral with rock-shaft 36 intermediate the forked ends of which is pivotally secured the lower end of the valve stem 26, and upon the outer end of said rock shaft 36 is fixed one end of a lever 45 which is operatively connected to or controlled by a device moving in response to varying conditions due to the supply and consumption of the fluid to be controlled.

46 denotes a hollow screw cap or dome secured to the upper part of the casing 10 which may be removed therefrom when access is desired to the interior of said casing for the purpose of cleaning or regrinding the valve or adjusting its parts.

In order to remove the valves from said casing after removing the cap 46 it simply becomes necessary to unscrew the cap 31 on the threaded valve stem 29 of the valve 28; unscrew the valve 28, then unscrew the seat bushing 21 whereupon the stem 26 and attached valve 27 may be lifted out of the casing after its lower end has been detached from the arm 44. The bearings 37, 38 are made removable so that the rock-lever 36 may be removed from the casing and reversed so that the lever 45 may be extended upwardly instead of downwardly when desired.

The operation of the apparatus may be briefly described as follows: As the rock shaft 36 moves toward the left (Fig. 1) both valves 27, 28 will be raised from their seats. The normal tendency of the fluid, however, will be to hold both valves seated, but the degree of force necessary to unseat the same will be much less than in an ordinary valve as a part of fluid pressure has a tendency to lift the valve 28 and thereby assist in balancing the valve 27. When the rock lever 36 is moved to the right the reverse operation will be performed and both valves again seated.

Having thus described my invention, what I claim and desire to secure by Letters Patent is:

1. A valve comprising a casing having an inlet and outlet, an inner receptacle therein communicating normally with said inlet, a fixed valve seat and an adjustable valve seat arranged in said receptacle, a valve stem having a valve fixed thereon adapted to engage said fixed valve seat, and a valve adjustably arranged upon said valve stem adapted to engage said adjustable seat, and means for securing said adjustable valve upon said valve stem and preventing the leakage of fluid between said stem and adjustable valve, substantially as specified.

2. A valve comprising a casing having an inlet and outlet, an inner receptacle therein communicating normally with said inlet, a fixed valve seat and an adjustable valve seat arranged in said receptacle, a valve stem, a valve fixed thereon adapted to engage said fixed seat, an adjustable tubular member on said valve stem, a valve on said tubular member adapted to engage said adjustable seat, and a cap arranged upon said tubular member and engaging the upper end thereof to seal the same, substantially as specified.

3. A valve seat comprising a casing having an inlet and outlet, an inner receptacle therein communicating normally with said inlet, a fixed valve seat and an adjustable valve seat arranged in said receptacle, a valve stem arranged in said receptacle having a threaded upper end, and a valve fixed adjacent to its lower end adapted to engage said fixed valve seat, a tubular stem arranged upon said valve stem having its inner and outer surfaces screw-threaded and in engagement with the threaded end of said valve stem, a valve fixed upon said tubular member adapted to engage said adjustable valve seat, and a screw cap arranged upon the threaded portion of said tubular member and adapted to seal the end of the said tubular member, substantially as specified.

4. A valve comprising a casing having an inlet and outlet, an inner receptacle therein communicating normally with said inlet, a fixed valve seat and an adjustable valve seat arranged in said receptacle, a valve stem having a threaded upper end, and a valve fixed adjacent to its lower end adapted to engage said fixed valve seat, a tubular stem arranged upon said valve stem having its upper end tapered and provided upon its inner and outer surfaces with screw threads and engaging the threaded end of said valve stem, a valve fixed upon said tubular member adapted to engage said adjustable valve seat, and a screw cap arranged upon the threaded portion of said tubular member adapted to engage the tapering end of said tubular member, substantially as specified.

5. In a valve the combination with a stem, a tubular member mounted on said stem, a valve arranged on said tubular member, and a cap engaging said tubular member for securing the same and the valve carried thereby in position upon said stem and preventing the leakage of fluid between said stem and tubular member, substantially as specified.

6. In a valve the combination with a stem, a tubular member adjustably mounted on said stem, a valve fixed on said tubular member, and a cap engaging said tubular member for securing the same and the valve carried thereby in position upon said stem and preventing the leakage of fluid between said stem and tubular member, substantially as specified.

7. In a valve the combination with a threaded stem, a tubular member provided upon its inner and outer surfaces with screw threads and adjustably mounted upon said threaded stem, a valve fixed on said tubular member, and a screw cap engaging said tubular member for securing the same and the valve carried thereby in position upon said stem and preventing the leakage of fluid between said stem and tubular member, substantially as specified.

Signed at the city of New York, in the county and State of New York, this seventeenth day of September, nineteen hundred and seven.

COLLATINUS A. TURNER.

Witnesses:
    CONRAD A. DIETERICH,
    A. R. ANGUS.